(12) United States Patent
Hoppe et al.

(10) Patent No.: US 8,136,790 B2
(45) Date of Patent: Mar. 20, 2012

(54) ELECTROMAGNETIC ACTUATOR FOR A HYDRAULIC DIRECTIONAL CONTROL VALVE

(75) Inventors: Jens Hoppe, Erlangen (DE); Markus Kinscher, Adelsdorf (DE)

(73) Assignee: Schaeffler Technologies GmbH & Co. KG, Herzogenaurach (DE)

( * ) Notice: Subject to any disclaimer, the term of this patent is extended or adjusted under 35 U.S.C. 154(b) by 500 days.

(21) Appl. No.: 12/367,594

(22) Filed: Feb. 9, 2009

(65) Prior Publication Data

US 2009/0200502 A1    Aug. 13, 2009

(30) Foreign Application Priority Data

Feb. 8, 2008 (DE) .......................... 10 2008 008 118

(51) Int. Cl.
 *F16K 31/02* (2006.01)
(52) U.S. Cl. ................... 251/129.15; 310/418; 335/255; 335/278
(58) Field of Classification Search ............. 251/129.15; 310/418; 335/225, 278
See application file for complete search history.

(56) References Cited

U.S. PATENT DOCUMENTS

| | | | | |
|---|---|---|---|---|
| 3,023,777 | A * | 3/1962 | Collins ..................... | 251/129.02 |
| 3,310,283 | A * | 3/1967 | Carlton ........................ | 251/357 |
| 3,368,789 | A * | 2/1968 | Helmut ..................... | 251/129.15 |
| 4,427,156 | A * | 1/1984 | Bouthors et al. ............. | 239/488 |
| 4,453,700 | A * | 6/1984 | Otsuki et al. ............. | 251/129.15 |
| 4,676,478 | A * | 6/1987 | Kiuchi ..................... | 251/129.08 |
| 4,805,871 | A * | 2/1989 | Nakamura ............... | 251/129.17 |
| 4,875,658 | A * | 10/1989 | Asai ........................ | 251/129.21 |
| 5,040,731 | A * | 8/1991 | Yokoyama et al. ........ | 239/585.4 |
| 5,076,326 | A * | 12/1991 | McCabe ................... | 137/625.65 |
| 5,158,236 | A * | 10/1992 | Sugiyama et al. ......... | 239/585.1 |
| 5,791,630 | A * | 8/1998 | Nakao et al. ............. | 251/129.19 |
| 5,820,099 | A * | 10/1998 | Rahbar et al. ............ | 251/129.15 |
| 5,918,635 | A * | 7/1999 | Wang et al. .............. | 137/625.65 |
| 6,336,621 | B1 * | 1/2002 | Ii et al. ..................... | 251/129.15 |
| 6,969,043 | B2 * | 11/2005 | Hirata et al. ............. | 251/129.15 |
| 7,808,134 | B2 * | 10/2010 | Burnett et al. ................. | 310/14 |

(Continued)

FOREIGN PATENT DOCUMENTS

DE    10153019    5/2003

(Continued)

*Primary Examiner* — John Fristoe, Jr.
*Assistant Examiner* — Marina Tietjen
(74) *Attorney, Agent, or Firm* — Volpe and Koenig, P.C.

(57) ABSTRACT

An electromagnetic actuator for a hydraulic directional control valve is provided. The electromagnetic actuator is used for adjusting a hydraulic directional control valve, for example, for the variable adjustment of the control times of an internal combustion engine. The electromagnetic actuator includes a housing (08) with which the electromagnetic actuator is mounted opposite the hydraulic directional control valve. The electromagnetic actuator further includes a coil (01) that is arranged in a coil body (03). The electromagnetic field that can be generated with the coil (01) acts on an armature (09) that is arranged in the electromagnetic actuator so that it can move axially. In order to prevent that the hydraulic medium of the hydraulic directional control valve leaks from reaching the electromagnetic actuator, the actuator includes a seal (13; 24) between the coil body (03) and the housing (08). The coil body has a holder (26, 28) for holding the seal (24). The holder (26, 28) guarantees the holding of the seal (24) in the coil body at least during the assembly of the electromagnetic actuator, so that when the coil body is introduced into the housing (08), the seal (24) remains at the provided location, even if it is not yet fixed by a pressure against the housing (08).

11 Claims, 4 Drawing Sheets

U.S. PATENT DOCUMENTS

| | | | |
|---|---|---|---|
| 7,959,128 B2 * | 6/2011 | Hoppe et al. | 251/129.07 |
| 2006/0022546 A1 * | 2/2006 | Kon et al. | 310/191 |
| 2007/0241298 A1 * | 10/2007 | Herbert et al. | 251/129.04 |
| 2007/0290581 A1 * | 12/2007 | Burnett et al. | 310/49 R |
| 2009/0294712 A1 * | 12/2009 | Hutchings et al. | 251/129.15 |
| 2010/0084590 A1 * | 4/2010 | Dayton et al. | 251/129.15 |

FOREIGN PATENT DOCUMENTS

| | | |
|---|---|---|
| DE | 10211467 | 9/2003 |
| DE | 10300974 | 7/2004 |
| DE | 102005048732 | 4/2007 |
| JP | 2000230578 * | 8/2000 |

* cited by examiner

ELECTROMAGNETIC ACTUATOR FOR A HYDRAULIC DIRECTIONAL CONTROL VALVE

CROSS-REFERENCE TO RELATED APPLICATIONS

This application claims the benefit of DE 10 2008 008 118.3, filed Feb. 8, 2008, which is incorporated by reference as if fully set forth.

BACKGROUND

The invention relates to an electromagnetic actuator for a hydraulic directional control valve that can be adjusted with the electromagnetic actuator. Such directional control valves are used, for example, in internal combustion engines for controlling hydraulic camshaft adjusters.

From DE 103 00 974 A1, a proportional solenoid valve of a camshaft adjustment device for motor vehicles is known. The proportional solenoid valve has a valve housing in which a piston can be displaced and that provides several connections by which hydraulic oil can be fed. The proportional solenoid valve further comprises an electromagnet part with which the piston can be adjusted by a tappet. In one embodiment of the proportional solenoid valve, a housing of the electromagnet part is provided on the end face with a recess into which a housing of the valve part projects with one end. In the base of the recess there is an annular groove that holds a sealing ring. On the end face, the housing of the valve part contacts against this sealing ring. This seal, however, does not enable a sealing of components within the electromagnet part. Therefore, the housing of the electromagnet part must guarantee a complete seal, because otherwise hydraulic oil could leak from the electromagnet part.

DE 10 2005 048 732 A1 relates to an electromagnetic actuator of a hydraulic directional control valve. FIG. 1 of DE 10 2005 048 732 A1, which is incorporated into this application as FIG. 1A, shows the arrangement of an inner rotor 42 and a hydraulic directional control valve 44 of a camshaft adjuster 40. The electromagnetic actuator comprises an armature that is arranged within an armature space so that it can move axially and a pole core that is arranged in a receptacle and the armature space is limited in one movement direction of the armature. Furthermore, the electromagnetic actuator comprises a coil that is preferably extrusion coated with a non-magnetizable material, so that a coil body is formed. The coil body has a hollow cylindrical base shape that fits in a positive fit connection in a housing of the electromagnetic actuator. The housing does not completely enclose the components of the hydraulic directional control valve, whereby a sealing element is needed between the coil body and the housing. A disadvantage in this solution is that the introduction of the seal is complicated for the assembly of the electromagnetic actuator, in order to guarantee, in particular, a long-term function.

DE 101 53 019 A1 shows an electromagnet that is suitable, in particular, as a proportional magnet for activating a hydraulic valve. The electromagnet comprises a hollow cylindrical coil body that is bounded by an upper pole shoe and a lower pole shoe. The electromagnet is enclosed by a magnetic housing. The coil body acts magnetically on a magnetic armature that forwards the magnetic force via a tappet rod for activating the hydraulic valve. The coil body is sealed relative to the hydraulic valve first by a non-magnetizable metal tube, wherein, however, another seal is needed via a housing of the proportional magnet.

A solution known from the state of the art for sealing a coil body relative to a not completely enclosed housing of an electromagnetic actuator is provided in that the seal is constructed as a liquid seal. Such liquid seals, however, are subjected to strong processing fluctuations as a function of, for example, the air humidity, the working life, the temperature, or the chemical changes during processing interruptions, so that a reliable function of the liquid seal can be guaranteed only with high expense.

DE 10 2005 048 732 A1 relates to an electromagnetic actuator of a hydraulic directional control valve. The electromagnetic actuator comprises an armature that is arranged within an armature space so that it can move axially and a pole core that is arranged in a receptacle and the armature space is limited in one movement direction of the armature. Furthermore, the electromagnetic actuator comprises a coil that is preferably extrusion coated with a non-magnetizable material, so that a coil body is formed. The coil body has a hollow cylindrical base shape that fits in a positive fit connection in a housing of the electromagnetic actuator. The housing does not completely enclose the components of the hydraulic directional control valve, whereby a sealing element is needed between the coil body and the housing. A disadvantage in this solution is that the introduction of the seal is complicated for the assembly of the electromagnetic actuator, in order to guarantee, in particular, a long-term function.

FIG. 1 shows another electromagnetic actuator according to the state of the art in a cross-sectional view. This electromagnetic actuator is constructed for adjusting a hydraulic directional control valve that is formed as a central valve and that is arranged radially within an internal rotor of a device for the variable adjustment of the control times of an internal combustion engine. The electromagnetic actuator initially comprises a coil 01 that is fed electrically via a plug-in contact 02. The coil 01 is arranged within a coil body 03 that is formed, for example, by an assembled and bonded housing or that is finished by extrusion coating of the coil 01 with a plastic. The magnetic field that can be generated with the coil 01 is transmitted to a movable magnetic armature 09 by a soft iron circuit that is made from a yoke 04, a yoke plate 06, a pole core 07, and a housing 08. The magnetic field exerts a magnetic force on the magnetic armature 09 across an air gap between the pole core 07 and the magnetic armature 09. This magnetic force is transmitted via a pressure pin 11 on a piston of the central valve (not shown). The electromagnetic actuator is mounted by a flange 12 of the housing 08 on the central valve or on a housing surrounding the central valve. Hydraulic oil is forced from the hydraulic directional control valve formed as a central valve through the housing 08 into the region of the magnetic armature 09. Because the electromagnetic actuator is not completely surrounded by the housing 08, it requires a seal 13 between the coil body 03 and the housing 08. The seal 13 is constructed as a planar piece seal, for example, in the form of an O-ring or a profiled sealing ring that is introduced into a groove in the coil body 03. The material cross section of the seal 13 is significantly smaller than the diameter of its annular shape. Due to this relationship, the seal 13 is taken to be mechanically unstable, so that during the assembly of the coil body 03 in the housing 08, the seal 13 can emerge partially or completely from the groove in the coil body 03, whereby the assembly is susceptible to failure.

SUMMARY

Starting with the electromagnetic actuator shown in FIG. 1, the objective of the present invention is to provide a solution for sealing the coil body of an electromagnetic actuator that allows a simple and secure assembly of the electromagnetic actuator.

This objective is met by an electromagnetic actuator according to the invention, as described in further detail below.

The electromagnetic actuator according to the invention is used for adjusting a hydraulic directional control valve, for example, for variable adjustment of the control times of an internal combustion engine. The electromagnetic actuator initially comprises a housing with which the electromagnetic actuator is mounted opposite the hydraulic directional control valve. The mounting opposite the hydraulic directional control valve can be realized directly or indirectly by a housing surrounding the hydraulic directional control valve. In a hydraulic directional control valve for setting the control times of an internal combustion engine, the electromagnetic actuator can be designed, for example, such that its housing can be mounted on a chain cover coaxial to the camshaft. The housing is formed, for example, by an assembled or bonded housing or it can be finished through extrusion coating of the coil 01 with a plastic or another non-magnetic material. The electromagnetic actuator according to the invention also comprises a coil that is arranged in a coil body. The coil body at least partially encloses the coil. The electromagnetic field that can be generated with the coil acts on an armature that is arranged in the electromagnetic actuator so that it can move axially. In order to avoid having the hydraulic medium of the hydraulic directional control valve forced, for example, via a region of the armature to the coil body that leaks from the electromagnetic actuator, the actuator comprises a seal between the coil body and the housing. Thus, a complete enclosure of the coil body by the housing is not required. According to the invention, the coil body has a holder for holding the seal. The holder guarantees a holding of the seal in the coil body at least during an assembly of the electromagnetic actuator, so that when the coil body is introduced into the housing, the seal remains at the provided location, even if it is not yet fixed by pressure against the housing.

One special advantage of the electromagnetic actuator is provided in that an inexpensive structural extension of the coil body allows a significantly simpler assembly of the electromagnetic actuator. The costs for the production of such an electromagnetic actuator are reduced significantly.

The holder is constructed preferably for a positive fit, non-positive fit, or material fit holding of the seal. Thus, the holder can be adapted to the corresponding requirements on the electromagnetic actuator, in that the holder is constructed, for example, by a special shape or by the construction as an adhesive for holding the seal. The holder can be constructed, for example, so that the seal is to be held on or in the holder. Often, seals made from an elastic material are used that are suitable for clamping in or on the holder from the outside.

The holder is preferably constructed in one piece with the coil body. Alternatively, the holder is to be attached to the coil body after it is completed, for example, by attaching connection elements or by depositing an adhesive. The electromagnetic actuator according to the invention can be constructed so that the seal is already attached to the coil body during the production of the coil body with the help of the holder or that the seal is attached during the assembly of the electromagnetic actuator on the coil body. The holder can be constructed for detachable or non-detachable holding of the seal.

The holder according to the invention is preferably constructed for holding a seal constructed by a circular sealing ring. Sealing rings are available in many configurations and have proven effective for many types of seals. In addition, a circular sealing ring can be held in an especially simple and secure way by the holder. O-rings or profiled sealing rings that allow secure sealing can be used, for example, for this purpose.

In one preferred embodiment of the electromagnetic actuator, the coil body has a hollow cylindrical base shape. With this base shape, a coil can be held that is wound in the form of a hollow cylinder that is preferred for most applications. For example, an electrical terminal connects to the hollow cylindrical base shape. The holder for the seal is formed on one of the two base surfaces of the hollow cylindrical base shape. The base surfaces of the hollow cylindrical base shape have the shape of a circular ring. The base surface provided with the holder preferably has a flat construction apart from the holder. Within the hollow cylindrical base shape of the coil body, i.e., in the hollow space, there are preferably the armature and also a yoke and a pole core. Such an arrangement has proven effective in the state of the art and is especially suitable for an electromagnetic actuator according to the invention.

The housing of the electromagnetic actuator according to the invention is preferably constructed so that it holds the hollow cylindrical coil body with its lateral surface and the flat base surface with the holder with a positive fit. Consequently, the housing provides a cylindrical interior that is adapted in its size to the hollow cylindrical coil body. Therefore, an assembly of the coil body in the housing can be realized such that the coil body is pressed into the housing. For complete pressing of the coil body into the housing, the coil body contacts, with its flat base surface with the holder, a corresponding flat surface of the housing, so that the held seal is pressed against this surface of the housing and a seal is formed between the housing and the coil body.

The coil body preferably has a circular groove for holding the seal. Such a groove allows the shape of the seal to be fixed, so that holding by the holder is simplified. The holder is preferably formed on an inner wall of the groove. For forming the holder, for example, undercutting of the inner wall is suitable, whereby the periphery of the inner wall is changed. The seal is forced in the held state due to its elasticity into the peripheral region of the undercut wall, whereby the holding of the seal is guaranteed. The attachment of the seal to the holder is realized such that the seal is pushed by elastic deformation across the region of the inner wall that is not undercut, whereupon the seal remains in the undercut region of the inner wall due to its elasticity. The undercut preferably has a shape curved inward in which, for example, an O-ring can snap. The undercut of the inner wall of the peripheral groove can be formed both on the smaller and also on the larger of the two lateral surfaces of the groove. In the first case, the seal is to be brought onto or into the undercut by an elastic increase and in the second case by an elastic reduction.

It is not necessary that the groove is constructed across the entire periphery of the seal. Likewise it is not necessary that the holder is constructed across the entire periphery of the seal. For example, the inner wall of the groove forming the holder can be interrupted, for example, such that it is constructed in segments relative to the periphery of the seal, i.e., relative to the peripheral direction of the groove. This segmented construction of the inner wall of the groove forming the holder allows slight deformation of the coil body during its production, especially when this is produced by an injection molding method. The segments of the inner wall of the groove forming the holder are preferably distributed uniformly across the peripheral direction and each have an intermediate space of equal size.

The segments of the inner wall of the groove forming the holder can also be constructed as segments of a ring that are arranged on the base surface of a coaxial cylindrical recess of the coil body. The groove is here formed between the inside of the lateral surface of the cylindrical recess and the annular segments.

BRIEF DESCRIPTION OF THE DRAWINGS

Additional advantages, details, and improvements of the present invention emerge from the following description of a preferred embodiment with reference to the drawing. Shown are.

DETAILED DESCRIPTION OF THE PREFERRED EMBODIMENT

Figure 1:
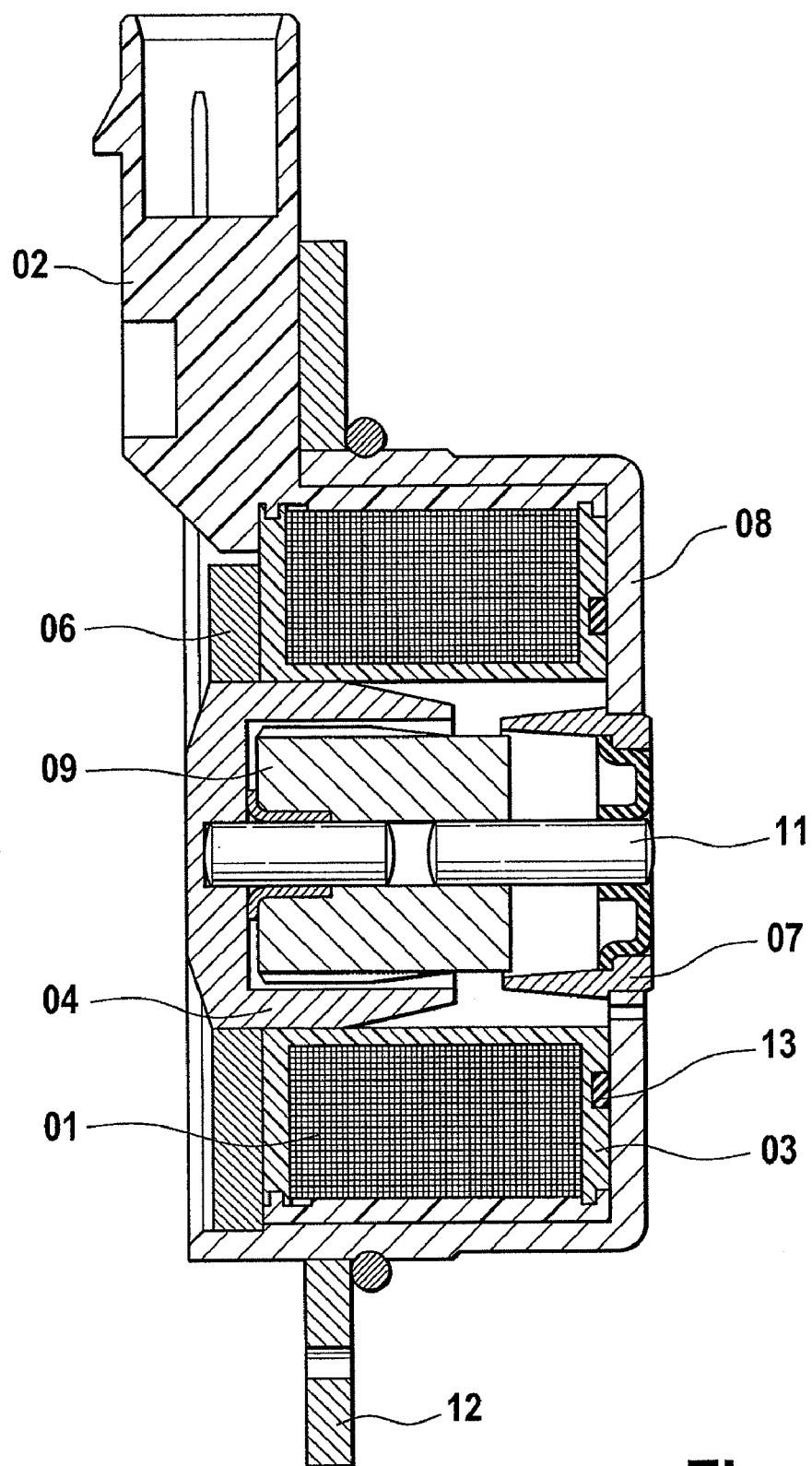
FIG. 1 is a view of an electromagnetic actuator for a hydraulic directional control valve according to the state of the art.
Figure 1A:
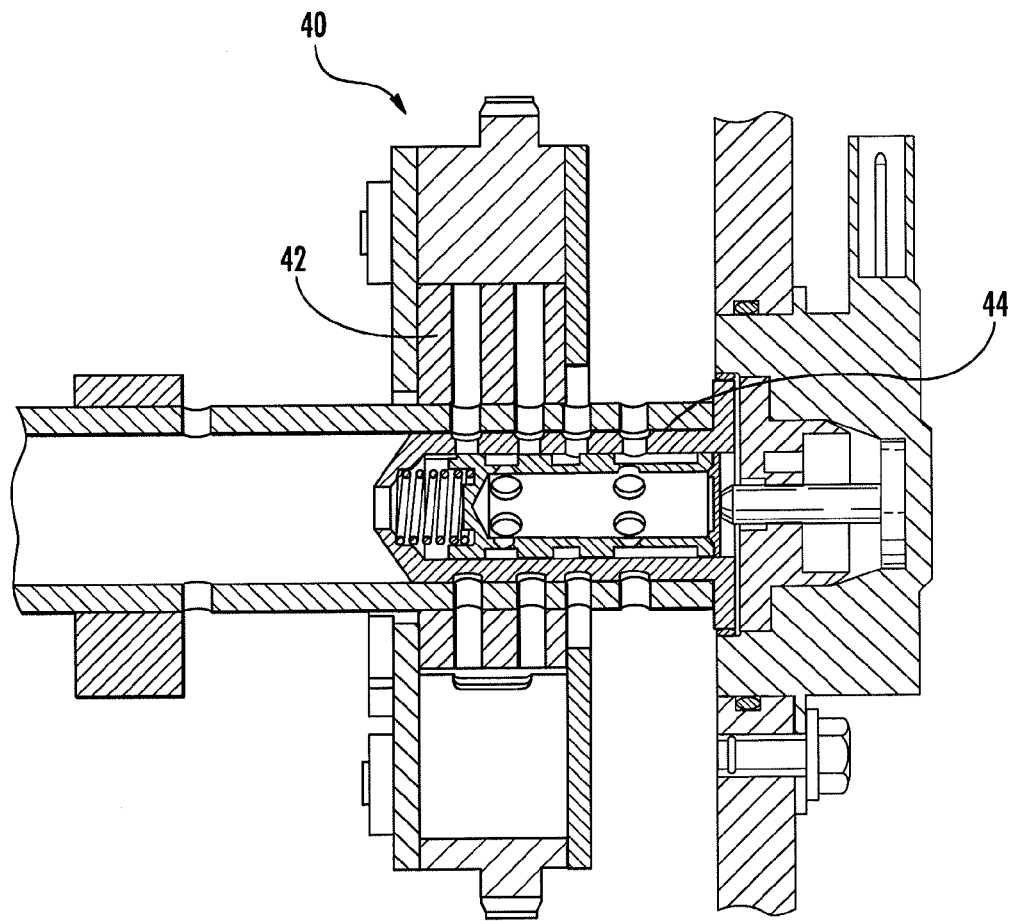
FIG. 1A is a cross-sectional view of a camshaft adjuster according to the state of the art.

FIG. 1 shows an electromagnetic actuator for a hydraulic directional control valve for variable adjustment of the control times of an internal combustion engine like those known from the state of the art and already explained in the introduction.

Figure 2:
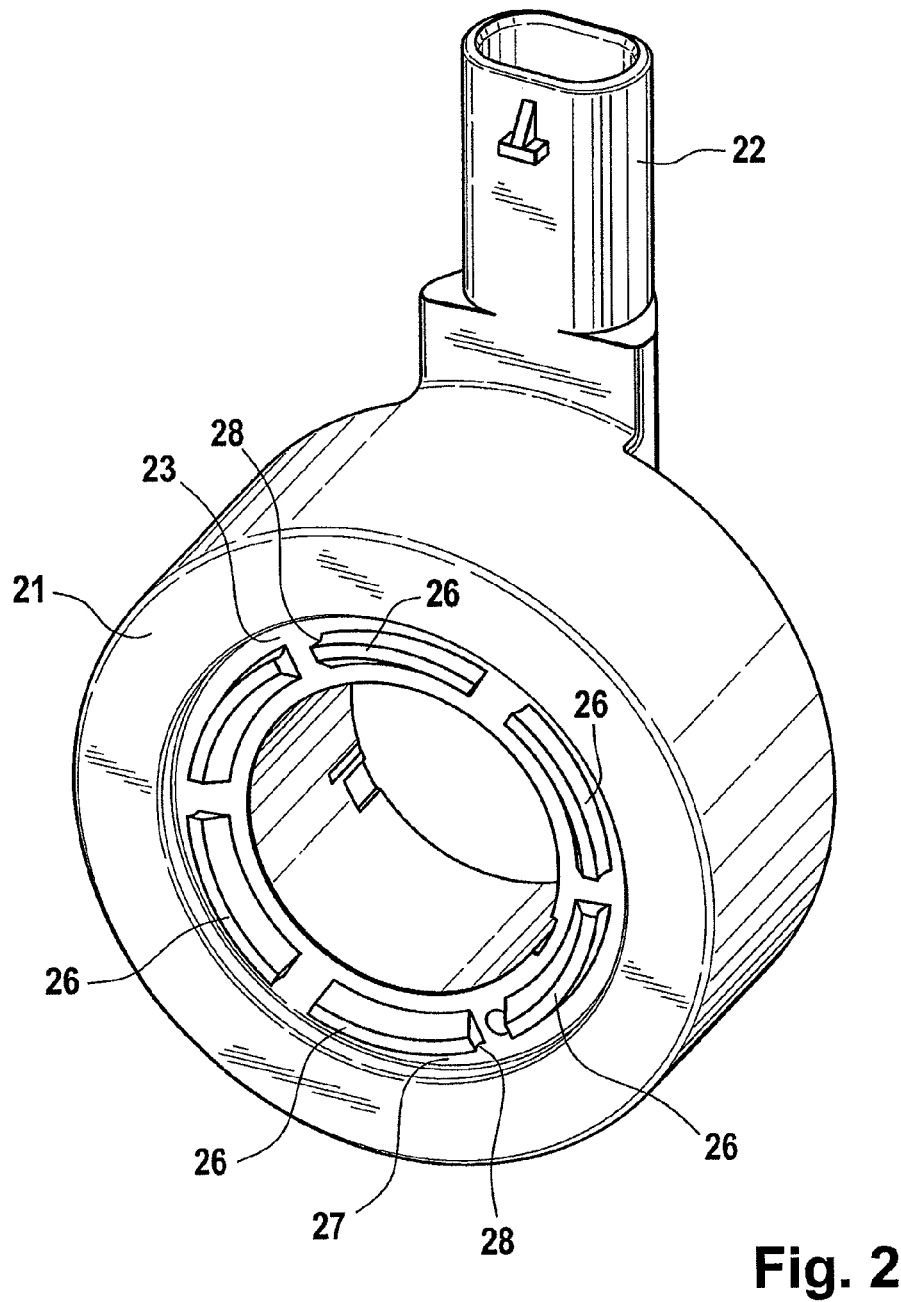
FIG. 2 is a view of a coil body of a preferred embodiment of the electromagnetic actuator according to the invention.

FIG. 2 shows a coil body of a preferred embodiment of the electromagnetic actuator according to the invention for a hydraulic directional control valve in a perspective view. This embodiment of the electromagnetic actuator is especially suited for the setting of a hydraulic directional control valve formed as a central valve that is arranged radially within an internal rotor of a device for variable adjustment of the control times of an internal combustion engine. Such an electromagnetic actuator is also designated as a central magnet and is used for the camshaft adjustment. The shown coil body initially has a hollow cylindrical base body 21 in which a coil (not shown) is arranged. The coil body 21 is completed by extrusion coating of plastic around the coil. In this way, the coil is electrically insulated and isolated from the hydraulic medium. Furthermore, the coil body has an electrical terminal 22 that is set on one of the two base surfaces of the hollow cylindrical base body 21. Through the use of the electrical terminal 22, the coil can be energized. On the base surface opposite the electrical terminal 22, the base body 21 of the coil body has a coaxial, cylindrical recess 23. The cylindrical recess 23 extends across approximately half of the circular ring form of the base surface of the hollow cylindrical base body 21 with respect to its diameter. The depth of the cylindrical recess 23 equals only a few millimeters and is dimensioned so that a seal 24 to be held (shown in FIG. 3) projects past the cylindrical recess 23 in a non-deformed state for an arrangement in this cylindrical recess and thus can establish a sealing contact to the housing 08 (shown in FIG. 1).

On the base surface of the cylindrical recess 23 there are six ring segments 26. The ring represented by the ring segments 26 is arranged coaxial to the cylindrical recess 23 and has a diameter that corresponds approximately to the average of the diameter of the hollow space of the hollow cylindrical base body 21 and the diameter of the cylindrical recess 23. The six ring segments 26 are distributed uniformly across the ring represented by these segments. The six ring segments are each of an equal size in the embodiment shown here. Likewise, the six intermediate spaces between the six ring segments 26 are each of equal size.

The segmentation of the ring segments 26 is used for simplified production of a coil body. The coil body comprising the hollow cylindrical base body 21, the electrical connection 22, and the ring segments 26 in the cylindrical recess 23, is constructed in one piece and is formed of a plastic injection molded part. Through the segmentation of the segment rings 26, the removal of a mold required for the injection molding is simplified. The removal is also possible or simplified by other measures, so that the segmentation can be eliminated.

The height of the ring segments 26 is dimensioned so that they does not project past the cylindrical recess 23. Between the outer periphery of the ring segments 26 and the inner lateral-surface wall of the cylindrical recess 23 there is a groove 27 in which the seal 24 (shown in FIG. 3) can be held. On the outer peripheral surface of the ring segments 26 there is a bulge 28 that is used for holding the seal 24. The bulge 28 is oriented in the direction of the rotational axis of the hollow cylindrical base body 21 and the ring represented by the ring segments 26 and also the groove 27. The bulge 28 can be created by undercutting of the ring segments 26 at a later time or by the shaping during the injection molding.

Figure 3:
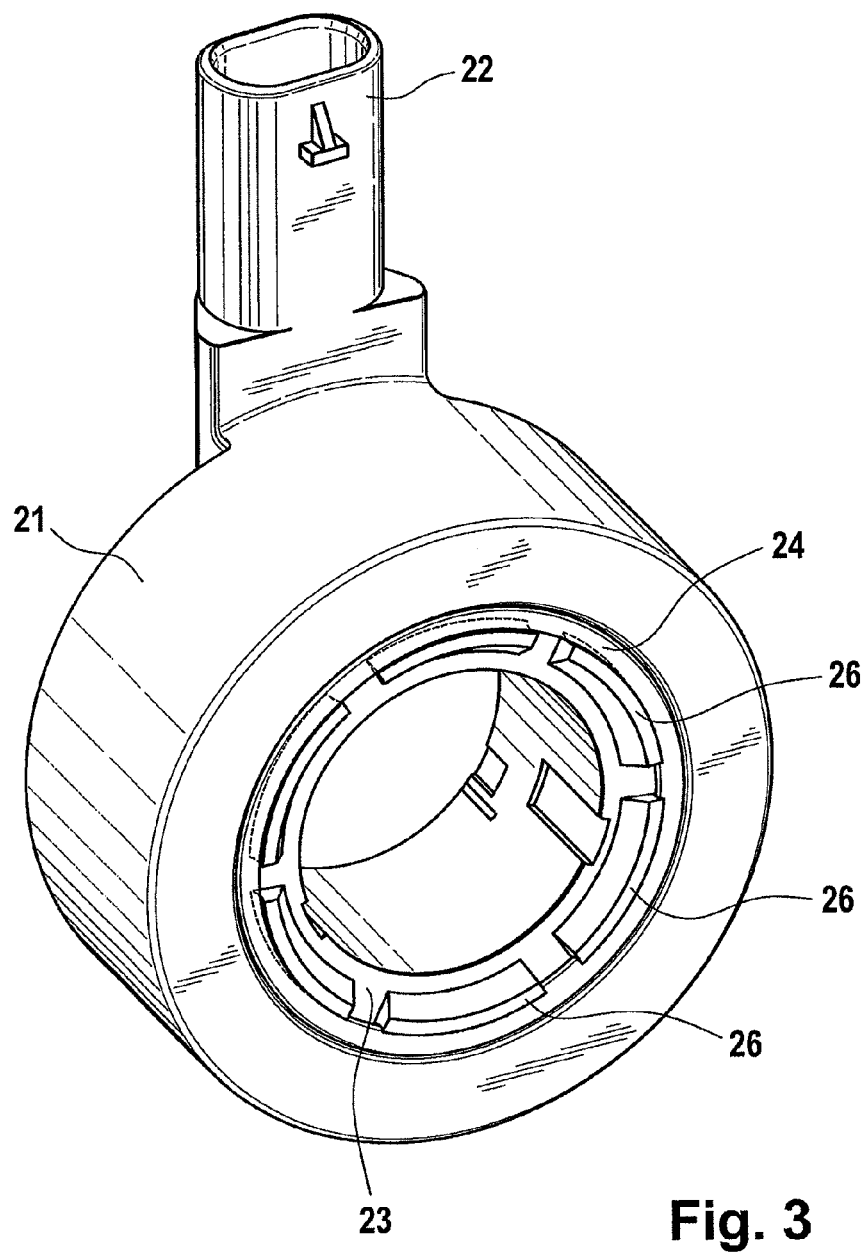
FIG. 3 is a view of the coil body shown in FIG. 2 with a sealing ring.

FIG. 3 shows the coil body shown in FIG. 2 in another perspective view, wherein, in this view, the seal 24 is placed in the groove 27. The seal 24 is preferably an O-ring made from an elastic material. In a non-deformed state of the seal 24, the inner diameter of the O-ring is less than the diameter of the ring represented by the ring segments 26. In particular, the diameter of the O-ring 24 is less than the diameter of the ring segments 26 in a region in front of the bulge 28. The diameter of the ring formed by the ring segments 26 can be dimensioned in the region of the bulge 28 so that it is equal to or somewhat larger than the inner diameter of the O-ring-like seal 24. The described configuration of the diameter of the seal 24 and the diameter of the ring formed by the ring segments 26 in the region in front of an in the bulge 28 is used for overcoming a force for deforming the seal 24, in particular, for increasing the inner diameter of the O-ring-like seal 24 when the seal 24 is introduced into the groove 27. As soon as the seal 24 is led into the region of the bulge 28 during its introduction into the groove 27, the seal 24 is partially or completely relieved of stress, so that its inner diameter decreases again. If the seal 24 is now to be removed from the groove 27 again, then initially a force is to be applied for deforming the seal 24, in particular, for increasing the inner diameter of the O-ring-like seal 24, in order to move this over the bulge 28. If this force is not applied, then the seal 24 is held in the groove 27 by the ring segments 26 with its bulge 28. This holding function of the ring segments 26 with the bulges 28 is especially important during an assembly of the coil body in the housing 08 (shown in FIG. 1). The seal 24 cannot leave the desired position under normal conditions due to it being held by the ring segments 26 with their bulge 28. Thus, it is guaranteed that when the coil body is inserted into the housing 08, the seal 24 does not leave the groove 27, but instead bumps against the intended position on the housing 08, wherein the seal 24 is pressed against the housing 08 and thus provides for a seal between the coil body and the housing 08. As soon as the coil body is mounted in the housing 08, in the normal case the holding of the seal 24 not significantly fixed by the ring segments 26 with their bulge 28, because the seal 24 is fixed by the pressure against the housing 08. The groove 27, however, further guarantees that the seal 24 maintains its circular shape and does not leave the desired position.

LIST OF REFERENCE SYMBOLS

01 Coil
02 Plug contact

03 Coil body
04 Yoke
06 Yoke plate
07 Pole core
08 Housing
09 Magnetic armature
11 Pressure pin
12 Flange
13 Seal
21 Hollow cylindrical base body
22 Electrical terminal
23 Cylindrical recess
24 Seal
26 Annular segments
27 Groove
28 Bulge

The invention claimed is:

1. Electromagnetic actuator for a hydraulic directional control valve comprising:
a housing (08) with which the electromagnetic actuator is mounted opposite the hydraulic directional control valve,
a coil (01) that is arranged in a coil body (03),
an armature (09) that is arranged in the electromagnetic actuator so that it can move axially, and
a seal (13; 24) between the coil body (03) and the housing (08),
the coil body has a holder (26, 28) for holding the seal (24) at least during an assembly of the electromagnetic actuator, the holder is an inwardly bulging undercut (28) located on an inner wall of a peripheral, circular groove (27) formed in the coil body, the inner wall of the groove forming the holder is constructed as a plurality of segments extending in the peripheral direction of the groove (27).

2. Electromagnetic actuator according to claim 1, wherein the holder (26, 28) is constructed for one of a positive fit, a non-positive fit, or a material fit holding of the seal (24).

3. Electromagnetic actuator according to claim 1, wherein the holder (26, 28) is shaped to hold the seal formed by a circular sealing ring (24).

4. Electromagnetic actuator according to claim 3, wherein the holder (26, 28) is shaped to hold a sealing ring formed as an O-ring (24) or a profiled sealing ring.

5. Electromagnetic actuator according to claim 1, wherein the coil body has a hollow cylindrical base shape (21), the holder (26, 28) is constructed on a base surface (23) of the hollow cylindrical base shape (21), and an armature (09), a yoke (04), and a pole core (07) are arranged in the hollow space of the hollow cylindrical base shape (21) of the coil body.

6. Electromagnetic actuator according to claim 5, wherein the coil body is held with a lateral surface thereof and a flat base surface with the holder (26, 28) in a positive fit connection by the housing (08).

7. Electromagnetic actuator according to claim 1, wherein the seal (24) is introduced by elastic deformation.

8. Electromagnetic actuator according to claim 1, wherein the segments of the inner wall of the groove (27) forming the holder (26, 28) are distributed uniformly in the peripheral direction of the groove (27) and an intermediate space is located between adjacent segments of the inner wall of the groove (27) forming the holder (26, 28).

9. Electromagnetic actuator according to claim 1, wherein the coil body is formed by extrusion coating of plastic around the coil.

10. Electromagnetic actuator according to claim 1, wherein the actuator is constructed for adjusting a hydraulic directional control valve that is formed as a central valve and that is arranged radially within an inner rotor of a device for the variable adjustment of the control times of an internal combustion engine.

11. Electromagnetic actuator for a hydraulic directional control valve comprising:
a housing (08) with which the electromagnetic actuator can be mounted opposite the hydraulic directional control valve,
a coil (01) that is arranged in a coil body (03),
an armature (09) that is arranged in the electromagnetic actuator so that it can move axially, and
a seal (13; 24) between the coil body (03) and the housing (08),
wherein the coil body has a holder (26, 28) for holding the seal (24) at least during an assembly of the electromagnetic actuator, the coil body has a peripheral, circular groove (27) for holding the seal (24), the holder (26, 28) is located on an inner wall located in the groove (27), the inner wall of the groove (27) forming the holder (26, 28) is constructed as a plurality of segments extending in the peripheral direction of the groove (27), the segments of the inner wall of the groove (27) forming the holder (26, 28) are distributed uniformly in the peripheral direction of the groove (27) and an intermediate space is located between adjacent ones of the segments; and
the segments of the inner wall of the groove (27) forming the holder (26, 28) are constructed as ring segments (26) that are arranged in a coaxial, cylindrical recess (23) of the coil body, wherein the groove (27) is constructed between an inner side of a lateral surface of the cylindrical recess (23) and the ring segments (26).

* * * * *